(12) United States Patent
Sato et al.

(10) Patent No.: US 10,272,810 B2
(45) Date of Patent: Apr. 30, 2019

(54) VEHICLE SEAT

(71) Applicant: TOYOTA BOSHOKU KABUSHIKI KAISHA, Aichi-ken (JP)

(72) Inventors: Shinsuke Sato, Aichi-ken (JP); Daisuke Miyamoto, Aichi-ken (JP); Kazuki Aojima, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 62 days.

(21) Appl. No.: 15/598,523

(22) Filed: May 18, 2017

(65) Prior Publication Data

US 2017/0341545 A1 Nov. 30, 2017

(30) Foreign Application Priority Data

May 24, 2016 (JP) .................. 2016-103597

(51) Int. Cl.
*B60N 2/80* (2018.01)
*B60N 2/68* (2006.01)
*B60N 2/803* (2018.01)

(52) U.S. Cl.
CPC ............. *B60N 2/803* (2018.02); *B60N 2/686* (2013.01); *B60N 2002/899* (2018.02)

(58) Field of Classification Search
CPC .......... B60N 2/80; B60N 2/803; B60N 2/894; B60N 2/686; B60N 2002/899; B64D 11/0646; A47C 7/38; B60R 2011/0017
See application file for complete search history.

(56) References Cited

U.S. PATENT DOCUMENTS

| 3,729,228 A * | 4/1973 | Inoue | B60N 2/803 297/396 |
| 4,492,408 A * | 1/1985 | Lohr | B60N 2/00 248/424 |
| 2012/0319449 A1* | 12/2012 | Schenten | B60N 2/2245 297/452.18 |
| 2014/0375097 A1* | 12/2014 | Okugawa | B60N 2/686 297/391 |

FOREIGN PATENT DOCUMENTS

| DE | 102011011515 A1 * | 8/2012 | ............ B60N 2/821 |
| JP | 2001061591 A * | 3/2001 | ............ B60N 2/686 |
| JP | 3617190 | 2/2005 | |

OTHER PUBLICATIONS

Machine Translation of DE102011011515; http://translationportal.epo.org/emtp/translate/?ACTION=description-retrieval&COUNTRY=DE&ENGINE=google&FORMAT=docdb&KIND=A1&LOCALE=en_EP&NUMBER=102011011515&OPS=ops.epo.org/3.2&SRCLANG=de&TRGLANG=en; Sep. 28, 2018 (Year: 2018).*

* cited by examiner

*Primary Examiner* — Ryan D Kwiecinski
(74) *Attorney, Agent, or Firm* — Greenblum & Bernstein, P.L.C.

(57) ABSTRACT

A vehicle seat includes: a seat cushion; a seat back that is connected to a rear part of the seat cushion; a head rest; and a connected member that is provided in the head rest. The head rest is arranged on top of the seat back in a standing state through the connecting member. The connecting member has a frame part, which constitutes a frame of the head rest, and a bracket part, which is fixed to the seat back side, in an integrated manner.

10 Claims, 10 Drawing Sheets

VEHICLE SEAT

INCORPORATION BY REFERENCE

The disclosure of Japanese Patent Application No. 2016-103597 filed on May 24, 2016 including the specification, drawings and abstract is incorporated herein by reference in its entirety.

BACKGROUND

1. Technical Field

The disclosure relates to a vehicle seat in which a head rest that is able to support an occupant's head is arranged on top of a seat back through a connecting member provided in the head rest.

2. Description of Related Art

In a typical vehicle seat, a head rest stay projects in a lower surface of a head rest. The head rest stay is, for example, an inverted U-shaped bar, and a connected end side of the head rest stay forms a frame part of the head rest and is arranged inside the head rest. Free ends of the head rest stay project from the lower surface of the head rest and are attached to the top of the seat back in a standing state.

Also, the seat back is provided with a structure for attaching the head rest stay. For example, in a vehicle seat disclosed in Japanese Patent No. 3617190, a seat back frame, which forms a frame of the seat back, includes a pair of left and right side frames, and plate-shaped joining plates connected to upper parts and lower parts of the left and right side frames, respectively. In an upper end of each of the side frames, a pipe-shaped part is provided, which is open at the top and the bottom. Semicircular-shaped parts are provided in left and right ends of the joining plate connected in the upper part, and the semicircular-shaped parts follow the outer shape of the rear part of the pipe-shaped part. The semicircular-shaped parts in the left and right ends are applied on the pipe-shaped parts of the side frames from the rear, and then welded and fixed to them. In the known art, the head rest stay projecting from the head rest is inserted in the pipe-shaped parts of the seat back frame, thereby arranging the head rest on top of the seat back.

SUMMARY

In the known art, since the seat back frame is processed into a pipe shape in order to arrange the head rest, it is likely that the structure of the seat back frame becomes complex. It is also possible to provide a bracket for attaching the head rest stay, in addition to the seat back frame. However, in a structure in which a bracket is provided separately, it is not possible to avoid an increase in the number of parts for the seat, thus making a seat structure complex. In addition, labor is required to fix the head rest stay and the bracket. The disclosure provides a vehicle seat that is able to fix a connecting member provided in a head rest to a seat back with a simpler structure.

A vehicle seat in an embodiment of the disclosure includes a seat cushion, a seat back that is connected to a rear part of the seat cushion, a head rest, and a connected member that is provided in the head rest. The head rest is arranged on top of the seat back in a standing state through the connecting member. In this type of structure, it is preferred that the connecting member provided in the head rest is fixed to the seat back with a simpler structure. Therefore, in this embodiment, the connecting member has a frame part, which forms a frame of the head rest, and a bracket part, which is able to be fixed to the seat back side, in an integrated manner. By integrally providing the frame part and the bracket part in the connecting member serving as a single part, it is possible to avoid complexity of a seat structure due to an increase in the number of parts. Then, the bracket part of the connecting member allows the head rest to be arranged in the seat back, while the frame part of the connecting member serves as the frame of the head rest.

In the vehicle seat of the embodiment, the connecting member having a plate shape may be provided with a reinforcing part that is a depressing and projecting part of the connecting member in a thickness direction, and the reinforcing part may be arranged across the bracket part and the frame part. In this structure, the reinforcing part is able to reinforce a border part between the bracket part and the frame part.

In the vehicle seat according to the foregoing embodiment, the flange part may be provided as at least a part of the reinforcing part. The flange part is an area where an edge of the connecting member is bent in the thickness direction. In this structure, the flange part, which forms a part of the reinforcing part, is able to favorably reinforce the border part between the bracket part and the frame part.

In the vehicle seat according to the foregoing embodiment, the flange part may include an edge of the connecting member on an outer circumference side. In this structure, by providing the flange part on the outer circumference side of the connecting member, it is possible to reinforce the border part between the bracket part and the frame part more favorably.

In the vehicle seat according to the foregoing embodiment, the frame part having a plate shape may be arranged in a seating side of the seat with respect to the bracket part from a base point provided in a part of the frame part. Also, a rib, which projects in a thickness direction of the frame part, may be arranged in the frame part, and the rib may be arranged in the base point. In this structure, since the frame part is arranged in the seating surface side of the seat from the base point, it is possible to arrange the head rest so as to receive the occupant's head. Also, the rib is able to reinforce the base point.

In the vehicle seat according to the foregoing embodiment, the frame part may extend upward from another base point provided in a part of the frame part above the base point. Also, the rib may be arranged in another base point. In this structure, since the frame part extends upward from another base point on the upper side, it is possible to arrange the head rest so as to support the occupant's head favorably. Also, the rib is able to reinforce another base point.

In the vehicle seat according to the foregoing embodiment, the rib may be provided across the base point and another base point. In this structure, the rib is able to reinforce the frame part from the base point to another base point favorably.

In the vehicle seat according to the foregoing embodiment, the frame part having a plate shape may be provided with a through-hole that extends in the thickness direction of the frame part, and the through-hole may be arranged in a center of the frame part in a seat width direction. In this structure, the through-hole of the frame part is arranged in a center in the seat width direction so that, for example, the through-hole is able to face the head of a seated occupant. Therefore, when the head rest supports an occupant's head, the occupant's head is arranged so as to fit in the through-hole. Thus, it is unlikely that hardness of the frame part is felt directly.

The vehicle seat according to the foregoing embodiment, the frame part may be provided with a rib that is projected in the thickness direction of the frame part, and the rib may have a shape projected towards the seating side of the seat and be provided on left and right sides of the through-hole in the seat width direction. In this structure, because of the through-hole and the ribs on the left and right sides of the through-hole, the frame part is able to receive an occupant's head as if wrapping around it.

In the vehicle seat according to the foregoing embodiment, the seat back may include a plate-shaped panel member that forms a frame of the seat back, and a fixing part that forms a part of the panel member and is able to fix the bracket part. Also, the plate-shaped bracket part may be fixed to the fixing part in a state where the bracket part is arranged so as to face the fixing part and at least a part of the bracket part is in surface contact with the fixing part. In this structure, since the bracket part is firmly fixed in a state where at least a part of the bracket part is in surface contact with the fixing part that forms a part of the panel member, the structure is excellent in stability in attaching the head rest.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
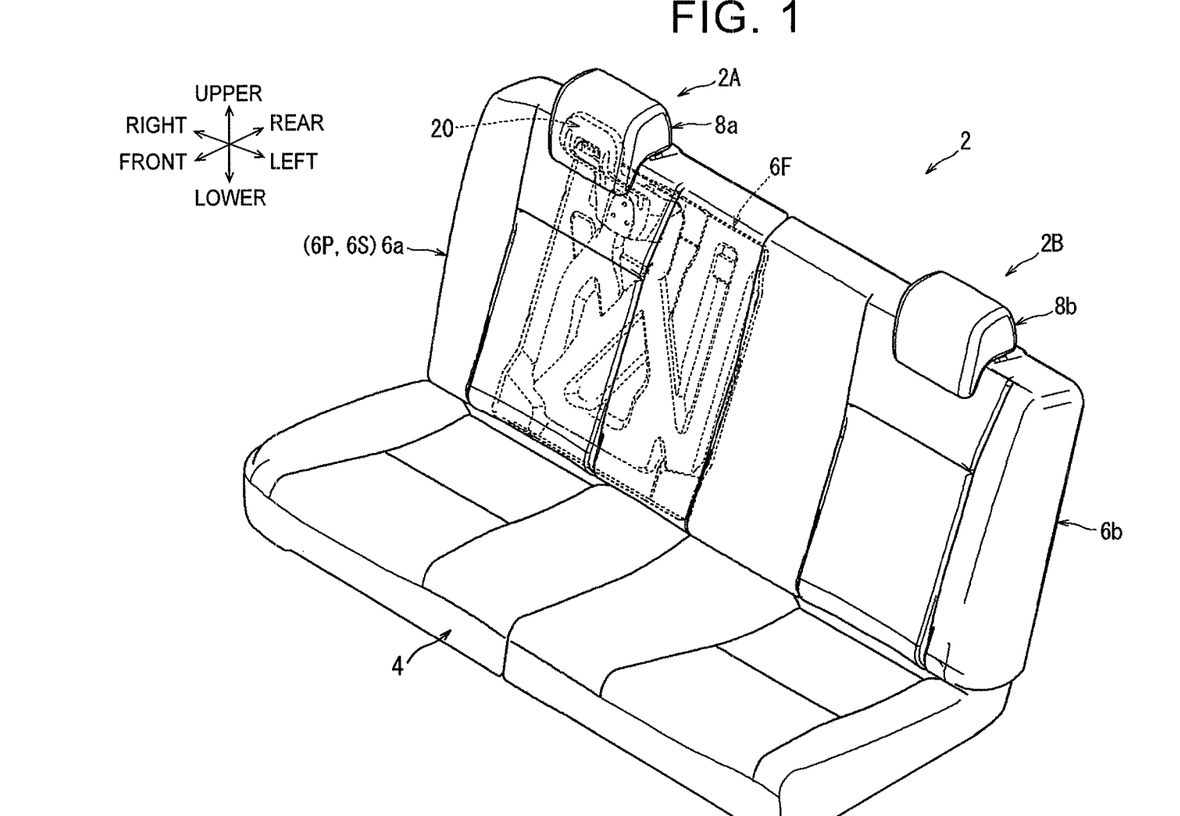
FIG. 1 is a partially transparent perspective view of a vehicle seat.
Figure 5:
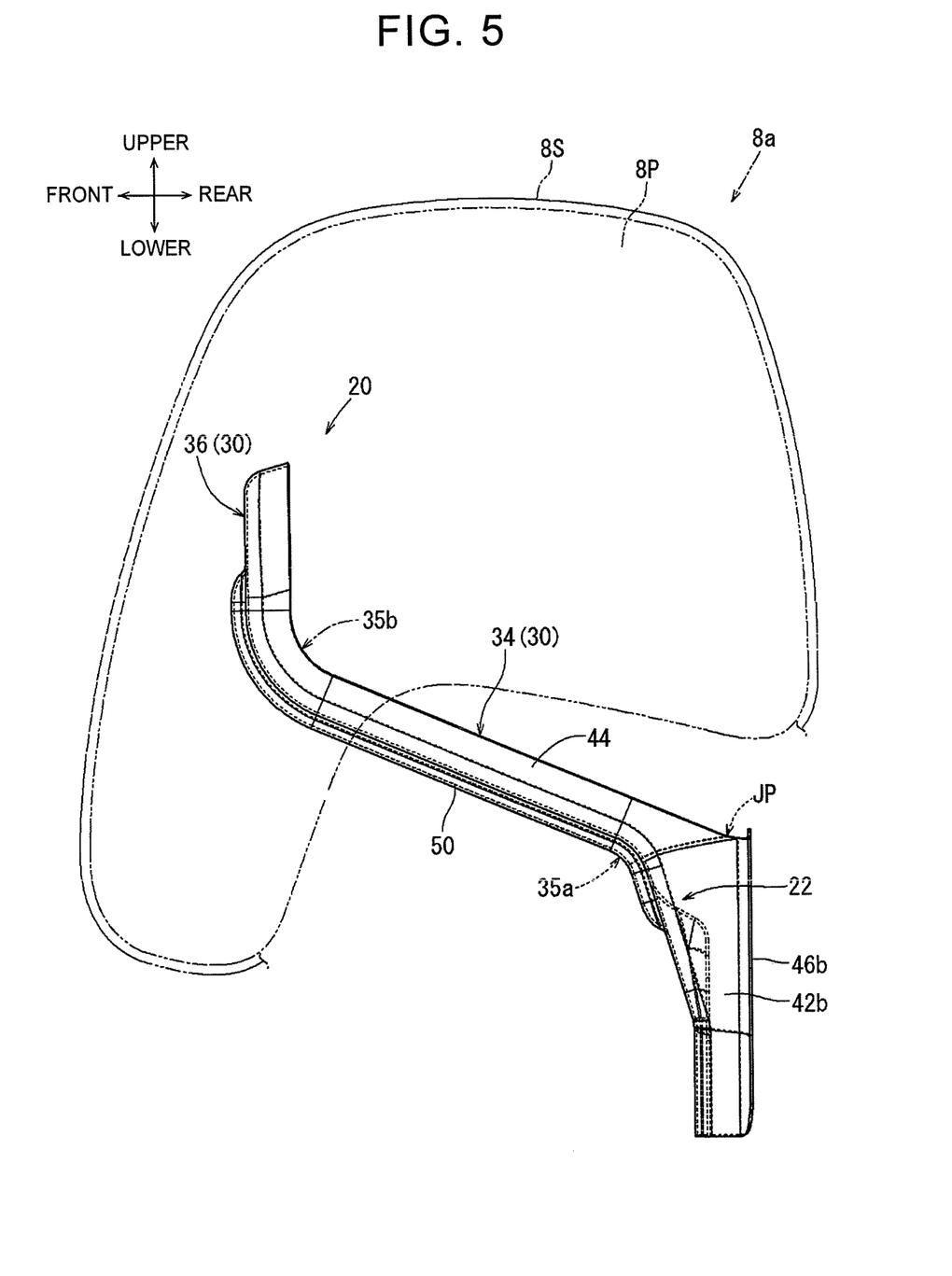
FIG. 5 is a side view of the connecting member.

Herein below, a mode for carrying out the embodiment is explained with reference to FIG. 1 to FIG. 12. In each drawing, arrows indicating a front-rear direction, an upper-lower direction, and a left-right direction of a vehicle seat are shown as appropriate for convenience. In FIG. 5, only a seat pad part of a head rest is shown. A vehicle seat 2 in FIG. 1 is a seat on which a plurality of occupants are able to be seated. A seat cushion 4 has a wide and bisymmetrical shape, and a first seat portion 2A and a second seat portion 2B are arranged so as to be bisymmetrical. The first seat portion 2A is a seat part arranged on the right side and includes a seat back 6a and a head rest 8a. The second seat portion 2B is a seat part arranged on the left side and includes a seat back 6b and a head rest 8b. Lower parts of the seat backs 6a, 6b in a standing state are connected to the rear part of the seat cushion 4. The head rests 8a, 8b are arranged on top of the corresponding seat backs 6a, 6b in the standing state, respectively.

In this example, later-described connecting members 20 are provided in the head rests 8a, 8b, respectively, and the head rests 8a, 8b are arranged on the seat backs 6a, 6b through the connecting members 20, respectively. In this type of structure, it is preferred that the connecting members 20 provided in the head rests 8a, 8b are fixed to the corresponding seat backs 6a, 6b, respectively, with a simpler structure. Therefore, in this example, the later-described connecting member 20 serving as a single part is fixed to the corresponding seat backs 6a, 6b. Each structure is explained in detail.

Since basic structures of the seat backs 6a, 6b are generally the same, details are given by using the right seat back 6a as an example. With reference to FIG. 1, the seat back 6a includes a seat cover 6S structuring a design surface of the seat, and a seat pad 6P that forms an outer shape of the seat and elastically supports an occupant, as well as a panel member 6F serving as a frame of the seat. The seat cover 6S is a surface material that covers the seat pad 6P and the panel member 6F, and may be made of, for example, fabric (woven fabric, knit fabric, non-woven fabric) or leather (natural leather, synthetic leather). Also, the seat pad 6P is arranged on the seating side of the panel member 6F, and may be made of resin foam such as polyurethane foam (density: 10 kg/m$^3$~60 kg/m$^3$) and so on.

Figure 2:
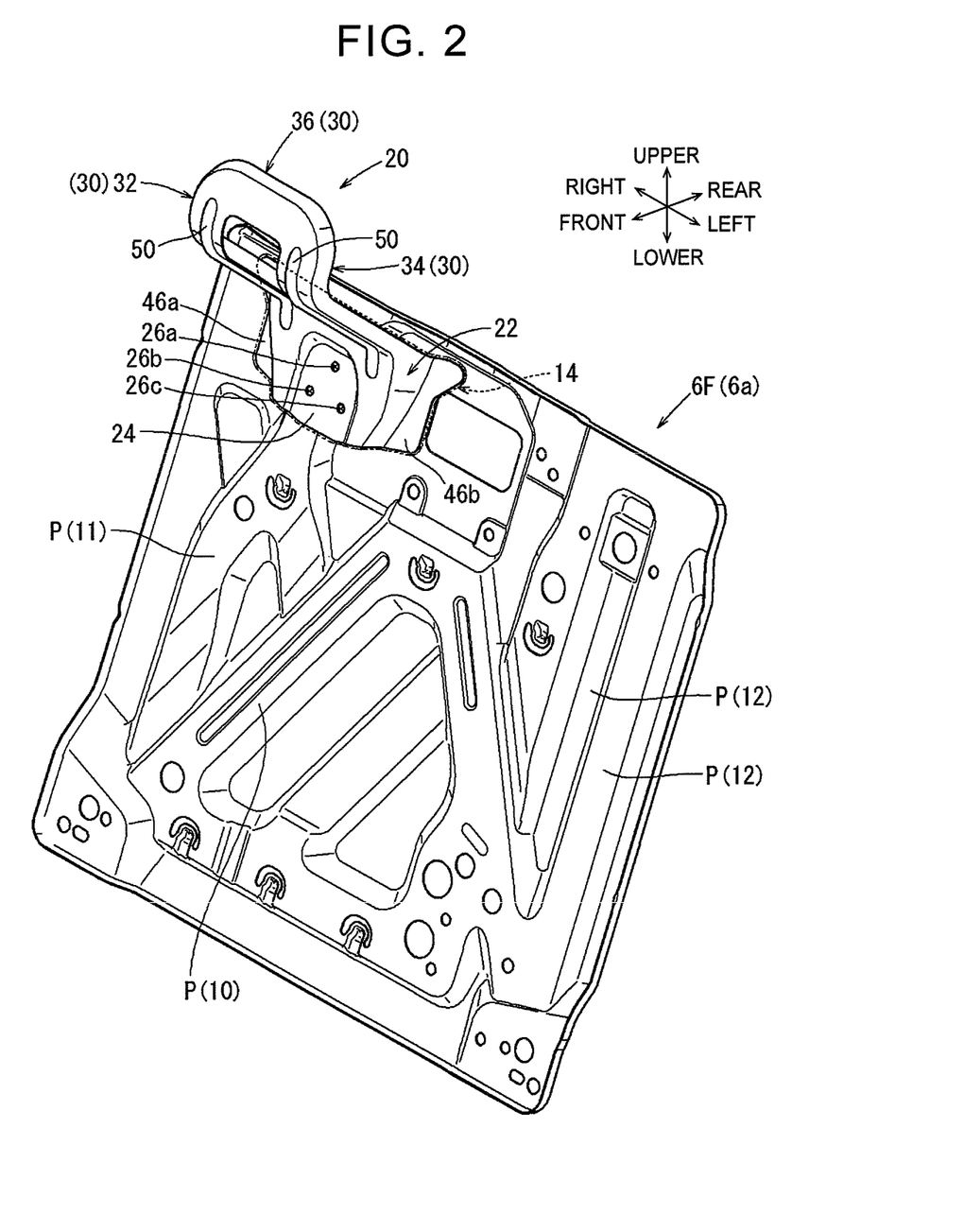
FIG. 2 is a perceptive view of a panel member to which a connecting member is attached.
Figure 3:
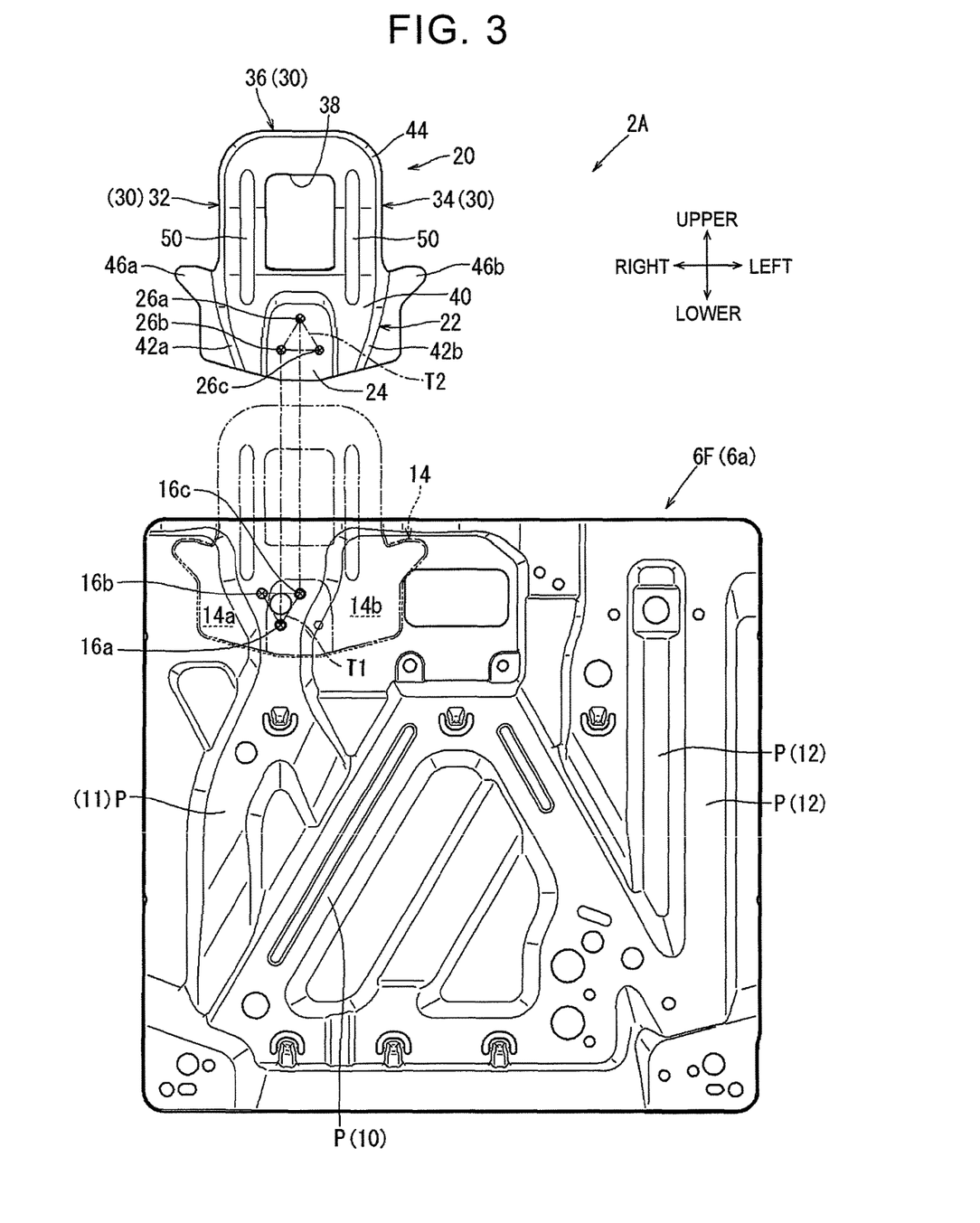
FIG. 3 is a front view of the panel member and the connecting member.

With reference to FIG. 2 and FIG. 3, the panel member 6F is a member that forms a frame of the seat back 6a, and has a plurality of reinforcing portions 10~12 and a fixing part 14. The panel member 6F is made of a plate material that is generally rectangular in a front view, which is long in the seat width direction, and the plate material may be formed of metal having excellent rigidity such as iron, steel, and stainless steel. Reinforcing portions (a central reinforcing portion 10, and left and right side reinforcing portions 11, 12) reinforce the panel member 6F, and are made of a plurality of projecting portions P that are made by bending and deforming a part of the panel member 6F so as to project in the seating side. Each of the projecting portions P has a generally trapezoidal shape in a transverse sectional view, and an upper base arranged on the seating side is generally flat. The central reinforcing portion 10 is made of a linearly projecting portion P, and has a generally triangular shape in a front view in which the vertex comes on the upper side. The central reinforcing portion 10 is arranged in the center of the panel member 6F in the seat width direction. Further, the left and right side reinforcing portions are made of the linear projecting portions P extending in the upper-lower direction, and arranged on the left and right sides of the central reinforcing portion 10, respectively. In the side reinforcing portion 11 on the right, the projecting portion P branched into two on the lower side joins together on the upper side, and the joined projecting portion P widens outwardly in the upper direction. In the side reinforcing portion 12 on the left, a pair of projecting portions P extending in the upper-lower direction is arranged in parallel on the left and right.

With reference to FIG. 3, the fixing part 14 is a portion that is used to fix a bracket part 22 of the later-described connecting member 20, and is formed in an upper right part of the panel member 6F. The fixing part 14 includes an upper side of the side reinforcing portion 11 on the right, and generally flat panel member parts (14a, 14b) arranged on the right and left of the side reinforcing portion 11, respectively. Then, in an upper base of the side reinforcing portion 11, which forms the fixing part 14, a plurality of holes (a first hole 16a~a third hole 16c) are formed for positioning. The plurality of holes 16a~16c are all generally circular holes (with the same shape, same diameter) and pass through the panel member 6F in the thickness direction. Then, the plurality of holes 16a~16c are arranged in corner parts of a virtual inverted triangle T1 in which the vertex comes to the bottom in a front view. This means that the first hole 16a at the bottom is arranged at a corner serving as the vertex of the virtual inverted triangle T1, and the second hole 16b on the right and the third hole 16c on the left are arranged in corners on the bottom-line side of the virtual inverted triangle T1.

Since the head rests 8a, 8b have the generally the same basic structure, the details are given using the right head rest 8a as an example. With reference to FIG. 3, the head rest 8a is a generally rectangular member in a front view. With reference to FIG. 5, the head rest 8a includes a skin 8S that structures a design surface of the head rest 8a, a pad part 8P that is able to elastically support an occupant's head, and the later-described connecting member 20. The skin 8S is a surface material that covers the pad part 8P, and may be made of materials explained for the seat cover 6S as examples. The pad part 8P is a member that forms an outer shape of the head rest 8a, and may be made of materials explained for the seat pad 6P as examples. The pad part 8P in this example is integrated with the seat pad 6P of the seat back 6 (in FIG. 5, only a part related to the head rest is shown for convenience). The pad part 8P may be integrated with the frame part 30 of the later-described connecting member 20 in a method such as insert molding. The pad part 8P may also be structured as a different member (a separate body) from the connecting member 20 and arranged on top of the frame part 30.

Figure 4:
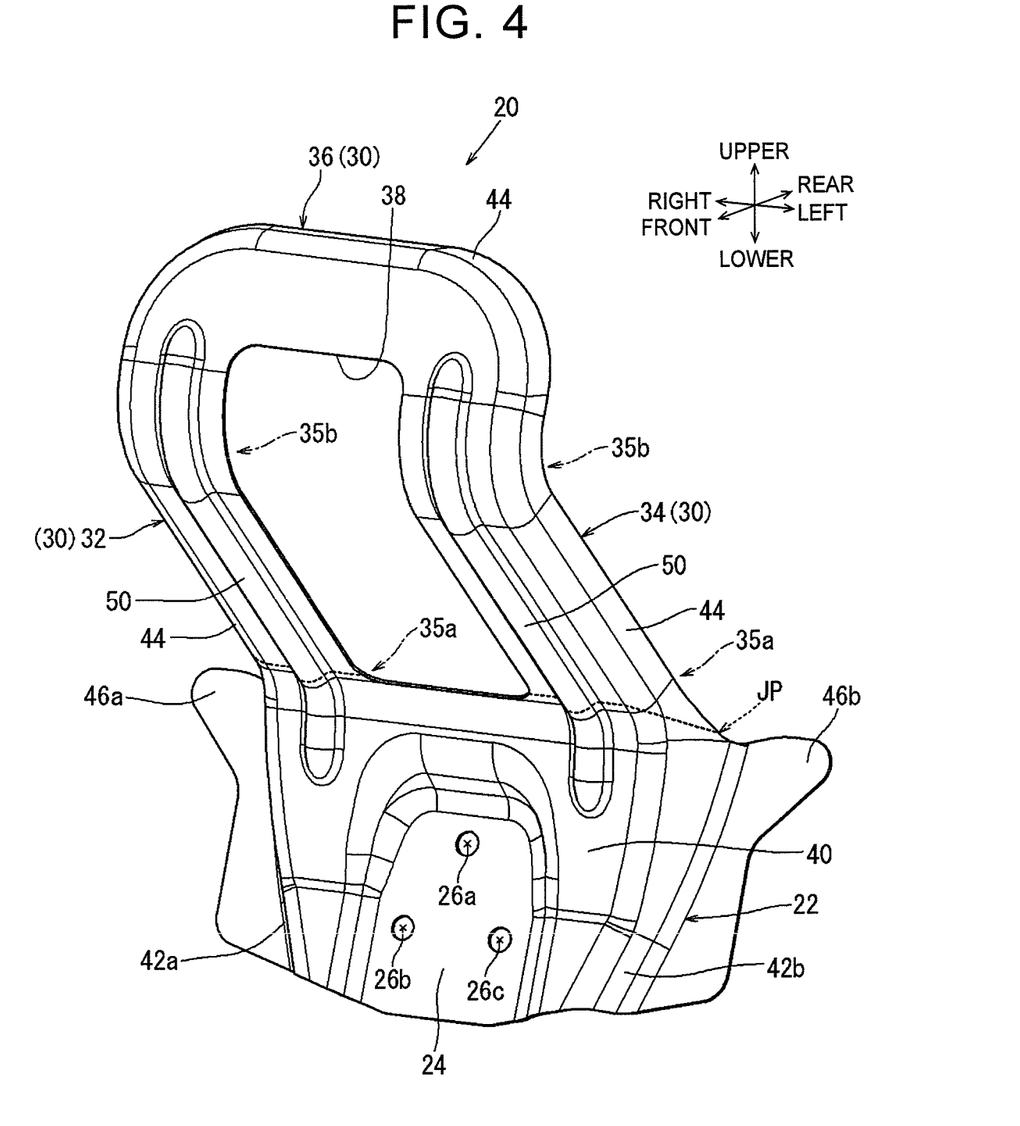
FIG. 4 is a perspective view of the connecting member.
Figure 6:
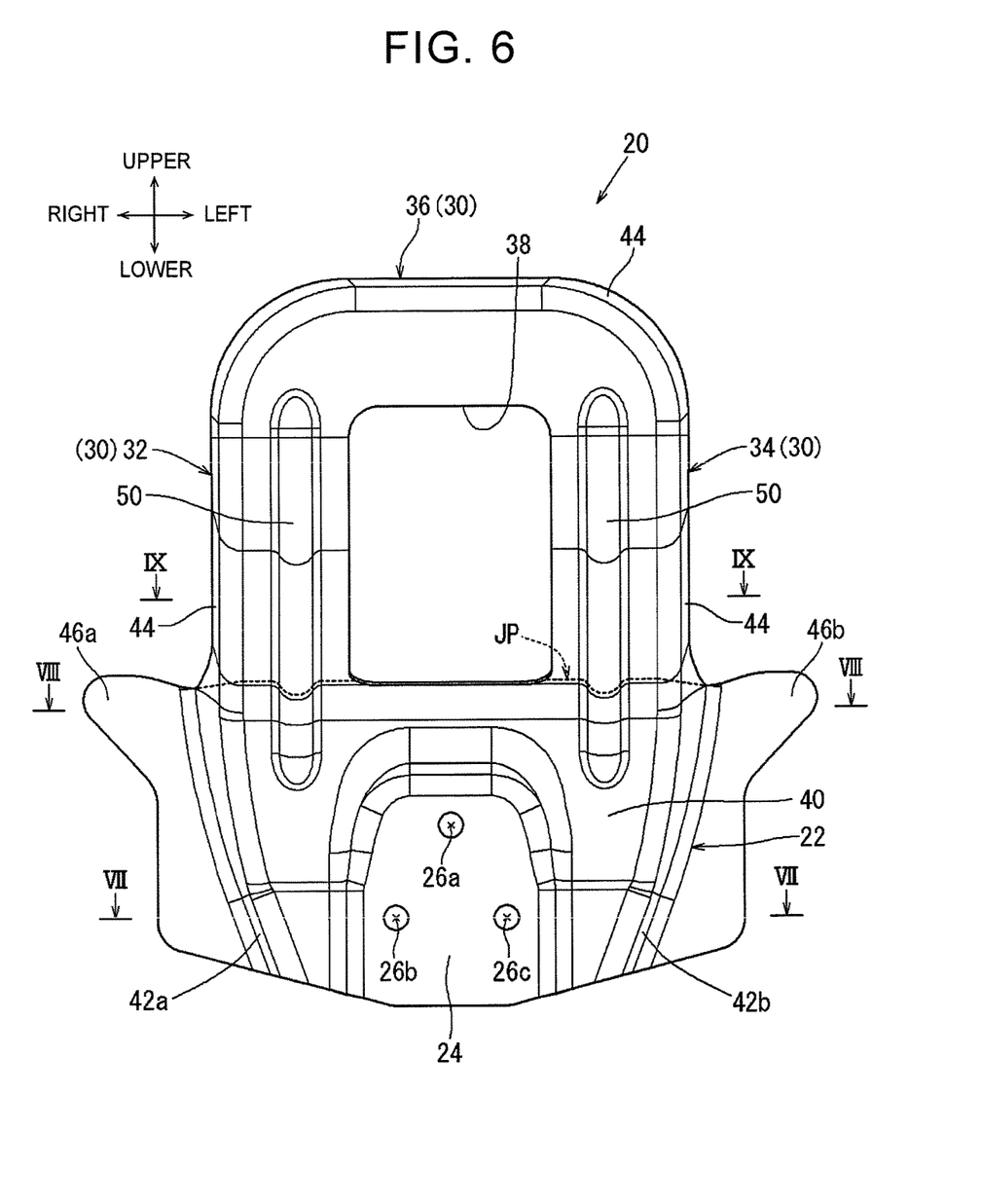
FIG. 6 is a front view of the connecting member.

With reference to FIG. 1, the connecting member 20 is a member provided in the head rest 8a, and is fixed to the fixing part 14 of the seat back 6a as shown in FIG. 2 and FIG. 3. With reference to FIG. 4 to FIG. 6, the connecting member 20 is made of a plate material having a bilaterally symmetrical shape, and includes the frame part 30 and a bracket part 22 as an integrated body, as well as a reinforcing part 40, a plurality of flange parts, and ribs 50 as a reinforcing structure (details of each part are given later). Then, in this example, with reference to FIG. 5, an upper part of the frame part 30 of the connecting member 20 is arranged inside the head rest 8a, and the bracket part 22 projects from a lower surface of the head rest 8a together with a lower part of the frame part 30 and is arranged so as to face the fixing part 14. A material of the connecting member 20 is not particularly limited as long as it has proper strength, but may be, for example, various types of metal and rigid resin. In the metallic connecting member 20, for example, by pressing a metal plate serving as a material into a given shape, the later-described frame part 30 and the bracket part 22 are formed integrally. In the connecting member 20 made of rigid resin, it is possible to form the later-described frame part 30 and the bracket part 22 integrally by using a given molding apparatus.

With reference to FIG. 2 and FIG. 3, the bracket part 22 is a portion that is fixed to the fixing part 14 of the panel member 6F. The bracket part 22 is arranged in the lower part of the connecting member 20 on the basis of a state where the connecting member 20 is attached to the seat back 6a. With reference to FIG. 4 and FIG. 6, the bracket part 22 is a generally rectangular plate-shaped portion that is long in the seat width direction in a front view, and includes a depressed part 24 and a plurality of positioning holes 26a~26c. The depressed part 24 is a generally rectangular depressed area provided in the center in the seat width direction, and a bottom surface of the depressed part 24 is arranged so as to face the upper base of the side reinforcing portion 11 on the right. Then, positioning holes (the first positioning hole 26a~the third positioning hole 26c) go through the depressed part 24 in the thickness direction, and have generally the same shape and same dimension as those of the corresponding holes 16a~16c of the panel member 6F shown in FIG. 3. With reference to FIG. 3, the first positioning hole 26a~the third positioning hole 26c are arranged in corners of a virtual triangle T2 whose vertex is at the top in a front view. The virtual triangle T2 has a shape made by inverting the virtual inverted triangle T1 in the fixing part 14 upside down. This means that the first positioning hole 26a on the upper side is arranged in the corner that forms the vertex of the virtual triangle T2, and the second positioning hole 26b on the right and the third positioning hole 26c on the left are arranged in corners on the bottom line side of the virtual triangle T2.

With reference to FIG. 4 to FIG. 6, the frame part 30 is a portion that forms a frame of the head rest 8a. The frame part 30 is integrated with the bracket part 22, and provided so as to extend upward from a border line JP in an upper edge of the bracket part 22. The frame part 30 has a generally inverted U-shape in a front view, and includes a right bar part 32 and a left bar part 34 that make a symmetrical pair, an upper bar part 36 that connects an upper end of the right bar part 32 and an upper end of the left bar part 34 with each other, and a through-hole 38 that is open in a generally rectangular shape in a front view. The through-hole 38 goes through the frame part 30 in the thickness direction, is formed in the center of the frame part 30 in the seat width direction, and arranged between the right bar part 32 and the left bar part 34. An outside dimension of the through-hole 38 is not particularly limited as long as the through-hole 38 allows an occupant's head to sink to the rear with respect to the frame part 30.

Also, the right bar part 32 and the left bar part 34 are bar-shaped portions arranged on the left and right sides of the through-hole 38, respectively, and provided so as to extend upward from the border line JP in the upper end of the bracket part 22. Then, since the right bar part 32 and the left bar part 34 have generally the same structure, details are given using the left bar part 34 as an example. With reference to FIG. 5, the left bar part 34 is bent into a crank shape in a side view, and includes a first base point 35a, which is an example of a base point of the disclosure, and a second base point 35b, which is an example of another base point of the disclosure. The first base point 35a is a portion in a lower end of the left bar part 34 and also deformed and bent to the front. The second base point 35b is a portion in an upper end of the left bar part 34 and also deformed and bent upward. From the first base point 35a, the left bar part 34 extends to the front gradually as it extends upward, and, from the second base point 35b, the left bar part 34 extends upward. Because of the both base points 35a, 35b, the frame part 30 is arranged in the seating side of the seat with respect to the bracket part 22. Therefore, it is possible to arrange the pad part 8P of the head rest 8a on the seating side with respect to the seat back 6a.

Figure 7:
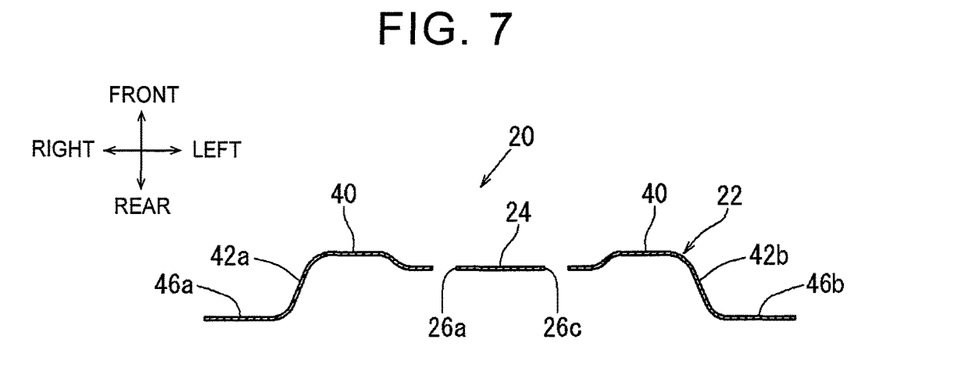
FIG. 7 is a sectional view taken along the line VII-VII in FIG. 6.
Figure 8:
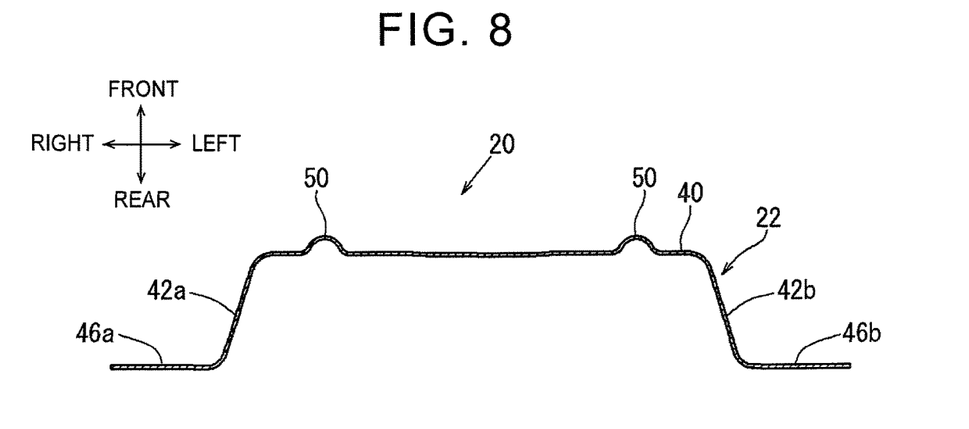
FIG. 8 is a sectional view taken along the line VIII-VIII in FIG. 6.

With reference to FIG. 6 to FIG. 9, the reinforcing part 40 is where a part of the connecting member 20 is depressed and projected in the thickness direction, and is arranged across the bracket part 22 and the frame part 30. With reference to FIG. 6 to FIG. 8, the reinforcing part 40 of the bracket part 22 is a relatively projecting portion on left and right, and upper sides of the depressed part 24 and has a pair of left and right lower flange parts 42a, 42b. The pair of left and right lower flange parts 42a, 42b are formed in the left and right edges of the bracket part 22 on the outer circumference side, respectively. This means that the lower flange part 42a on the right is a projecting portion made by bending a right outer end of the bracket part 22 to the rear, which is the thickness direction, and the lower flange part 42b on the left is a projecting portion made by bending a left outer end of the bracket part 22 also to the rear. In left and right tips of the lower flange parts 42a, 42b, flat plate-shaped protruding portions 46a, 46b protrude outwardly, respectively. With reference to FIG. 3, the protruding portions 46a, 46b may be arranged so as to face the corresponding panel member parts (14a, 14b) of the fixing part 14, respectively.

Figure 9:
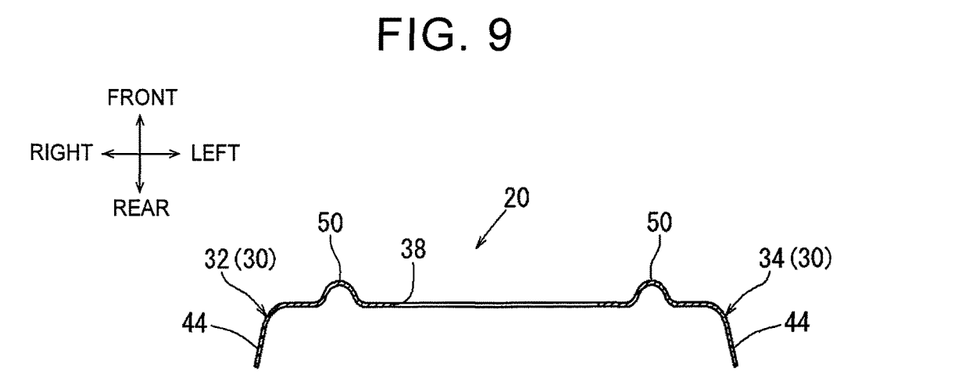
FIG. 9 is a sectional view taken along the line IX-IX in FIG. 6.

With reference to FIG. 6 and FIG. 9, an upper flange part 44, which is a single connected body, is formed in an edge of the frame part 30 on the outer circumference side as a reinforcing part of the frame part 30. The upper flange part 44 is formed by bending an outer end of the frame part 30 on the outer circumference side to the rear. A right portion of the upper flange part 44 is a portion projected towards the rear, which is the thickness direction, by bending the right outer end of the right bar part 32. A portion of the upper flange part 44 arranged on the left side is a portion also projected towards the rear by bending the left outer end of the left bar part 34. The left and right portions of the upper flange part 44 are connected to be integrated through a portion of the upper flange part 44 provided in an upper outer edge of the upper bar part 36. With reference to FIG. 6, the right portion of the upper flange part 44 provided in the right bar part 32 is connected with the corresponding lower flange part 42a on the right side of the bracket part 22. Further, the left portion of the upper flange part 44 provided in the left bar part 34 is connected with the lower flange part 42b on the left side of the bracket part 22. Since each of the flange parts 42a, 42b, 44 that forms the reinforcing part 40 is formed across the bracket part 22 and the frame part 30 in this way, the border line JP between the bracket part 22 and the frame part 30 is reinforced preferably.

With reference to FIG. 5 and FIG. 6, the ribs 50 are portions where frame part 30 is partially projected in the thickness direction, and provided in the right bar part 32 and the left bar part 34, respectively. The rib 50 of the right bar part 32 and the rib 50 of the left bar part 34 have generally the same basic structure. Therefore, details are given using the rib 50 of the right bar part 32 as an example. The rib 50 is formed by deforming and projecting the center of the right bar part 32 to the front, which is the thickness direction. The rib 50 has a generally semicircular shape in a transverse section with reference to FIG. 9, and has a curved shape that becomes gradually narrower towards the front. With reference to FIG. 5, the rib 50 is formed from the lower end to the upper end of the right bar part 32, and is arranged across the first base point 35a and the second base point 35b. Thus, the rib 50 preferably reinforces the first base point 35a, the second base point 35b, and the right bar part 32 between both base points 35a, 35b. Further, in this example, with reference to FIG. 6 and FIG. 9, the rib 50 of the right bar part 32 and the rib 50 of the left bar part 34 are provided on the right and left sides of the through-hole 38, respectively. Therefore, the frame part 30 is formed into a curved shape projecting to the rear of the seat due to the ribs 50 on the left and right sides of the through-hole 38, and projects to the front gradually from the center towards the left and right ends in the seat width direction.

With reference to FIG. 1, the head rests 8a, 8b are arranged on top of the seat backs 6a, 6b in a standing state, respectively. In this case, with reference to FIG. 2 and FIG. 3, the connecting member 20 provided in the head rest 8a and so on is fixed to the fixing part 14 of the panel member 6F. In this type of structure, it is preferred that the connecting members 20 provided in the head rests 8a, 8b, respectively, are fixed to the corresponding seat backs 6a, 6b, respectively, with a simpler structure. Therefore, in this example, the connecting member 20 is structured as a single part in which the frame part 30 and the bracket part 22 are integrated.

Figure 10:
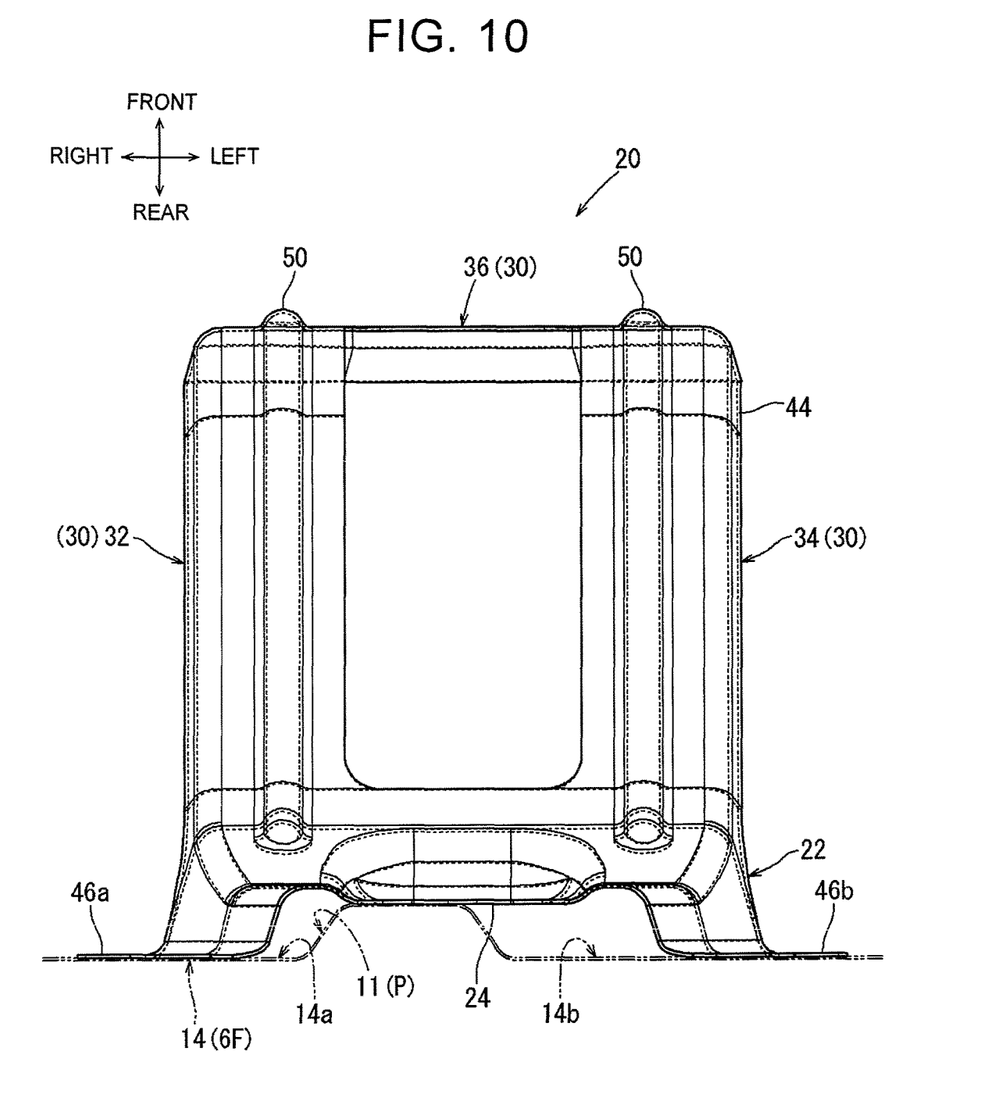
FIG. 10 is a bottom view of the connecting member.

With reference to FIG. 3, for example, in the first seat portion 2A, while arranging the connecting member 20 so as to face the fixing part 14 in the upper right part of the panel member 6F, an appropriate part of the bracket part 22 is fixed to the fixing part 14 by welding. On that occasion, the first positioning hole 26a on the upper side of the bracket part 22 and the second positioning hole 26b on the right side are located at positions of the third hole 16c on the left side of the fixing part 14 and the first hole 16a on the lower side, respectively, in this order. In this state, with reference to FIG. 10, the depressed part 24 is in surface contact with the upper base of the side reinforcing portion 11 on the right side, and the right and left protruding portions 46a, 46b are in surface contact with the right and left panel member parts 14a, 14b of the side reinforcing portion 11, respectively. Thus, it is possible to fix both the protruding portions 46a, 46b and the depressed part 24 to the corresponding panel member parts 14a, 14b, and 11, respectively, by welding. In this example, it is possible to use the frame part 30 of the connecting member 20 as the frame part of the head rest 8a, and it is also possible to arrange the head rest 8a in the seat back 6a by using the bracket part 22 of the connecting member 20.

Figure 11:
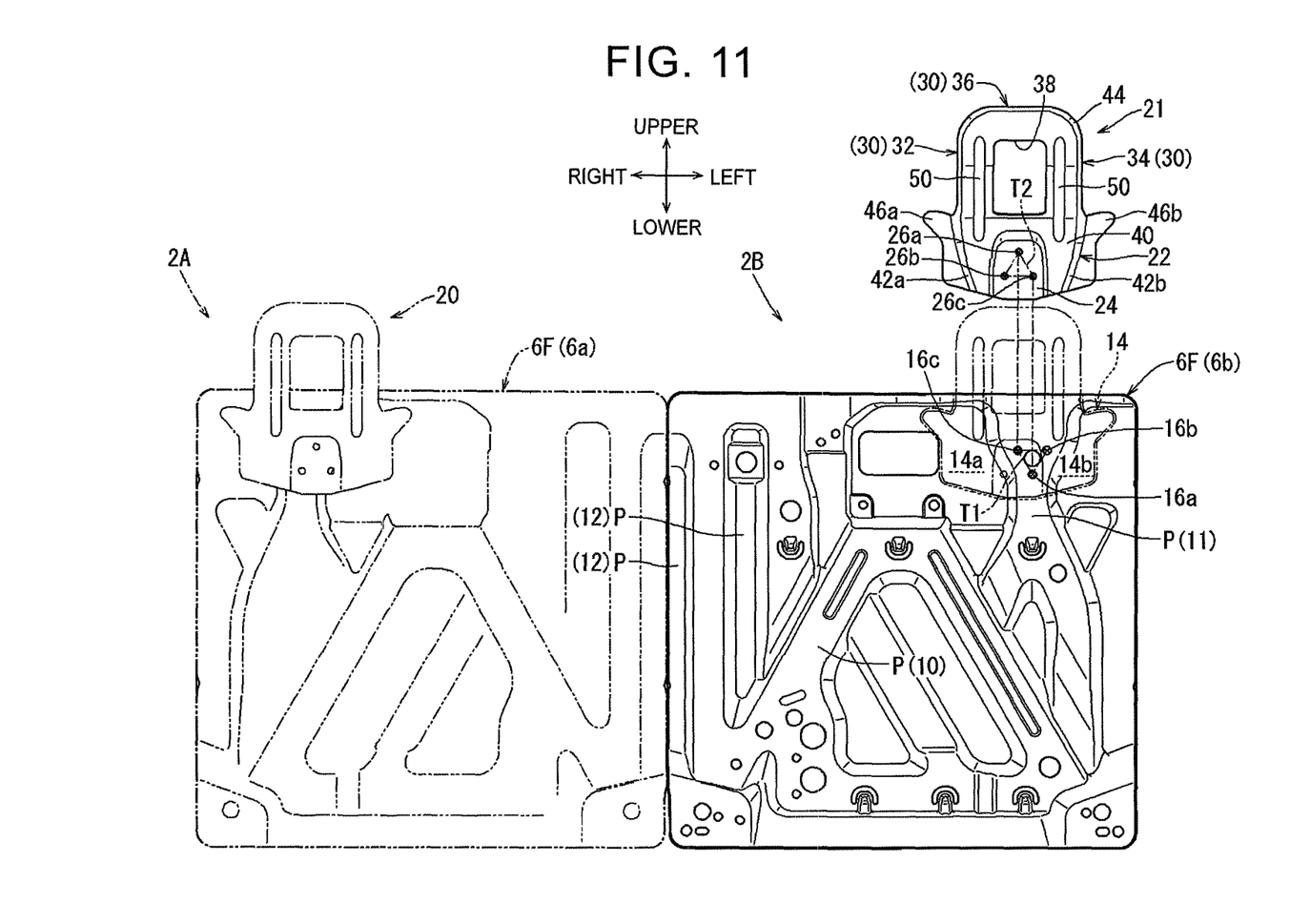
FIG. 11 is a front view of another panel member and another connecting member.
Figure 12:
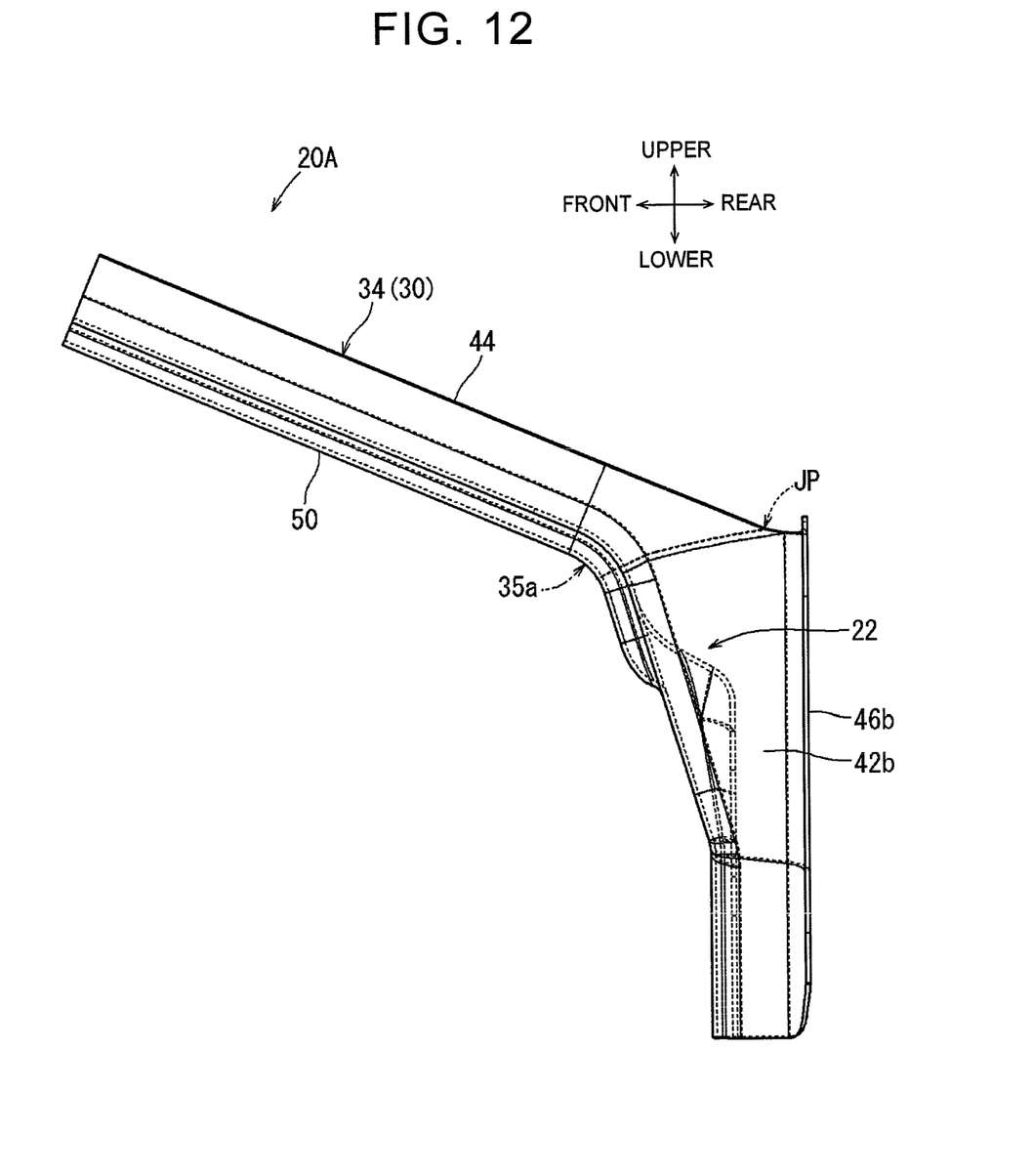
FIG. 12 is a side view of a connecting member according to a modification.

With reference to FIG. 11, in the second seat portion 2B, while arranging another connecting member 20 so as to face a fixing part 14 in a left upper part of another panel member 6F, it is possible to fix an appropriate part of a bracket part 22 to the fixing part 14 by welding. Another connecting member 20 has the same structure as the connecting member 20 of the first seat portion 2A, and another panel member 6F has a generally same structure as the panel member 6F of the first seat portion 2A and is arranged so as to be bisymmetrical to the panel member 6F. In the second seat portion 2B, a first positioning hole 26a on an upper side and a third positioning hole 26c on a left side of the bracket part 22 are located at positions of a hole 16c on the right side and a hole 16a on a lower side of the fixing part 14, respectively, in this order. Then, both protruding portions 46a, 46b and a depressed part 24 are positioned at corresponding panel member parts 14a, 14b, and 11, and fixed by welding. Thus, in this example, in each of the seat portions 2A, 2B, it is possible to locate each of the connecting members 20 at an appropriate position in the corresponding fixing part 14 by selectively using appropriate positioning holes and holes.

With reference to FIG. 1, when an occupant is seated on a vehicle seat, each of the head rests 8a, 8b is able to support an occupant's head that leans on each of the seat backs 6a, 6b. On this occasion, with reference to FIG. 5, for example, the first seat portion 2A is able to accommodate the occupants' head because the pad part 8P of the head rest 8a is arranged on the seating side of the seat back 6a by both base points 35a, 35b of the frame part 30 of the connecting member 20. Also, with reference to FIG. 6, when an occupant's head abuts on the seating side of the head rest 8*a*, the occupant's head is arranged so as to fit in the through-hole 38. Therefore, it is unlikely that the occupant feels hardness of the frame part 30 directly. Further, due to the through-hole 38 and the left and right ribs 50, the frame part 30 has a curved shape that projects to the rear of the seat and also projects to the front gradually from the center towards the left and right ends in the seat width direction. Therefore, the head rest 8*a* is able to receive the occupant's head as if wrapping around it. With reference to FIG. 4 to FIG. 6, since the connecting member 20 is provided with various types of reinforcing structures 40, 50 and so on, the head rest 8*a* has a structure with preferred strength and excellent support performance. In particular, since the flange parts 42*a*, 42*b*, 44, which form the reinforcing part 40, are formed across the bracket part 22 and the frame part 30, the border line JP between the bracket part 22 and the frame part 30, which tends to be a structural weak point, is reinforced favorably.

As explained so far, in this example, the connecting member 20 serving as a single part is provided with the frame part 30 and the bracket part 22 integrally. Therefore, it is possible to favorably avoid complexity of a seat structure caused by an increase of the number of parts. It is also possible to omit a fixing work that would be required when the frame part 30 and the bracket part 22 are formed as separate bodies. Further, while using the frame part 30 of the connecting member 20 as a frame part of each of the head rests 8*a*, 8*b* like before, the head rests 8*a*, 8*b* are arranged in the seat backs 6*a*, 6*b*, respectively, by using the bracket parts 22 of the connecting members 20. Therefore, it is not necessary to make the structure of the panel member 6F complex more than necessary in order to attach the connecting member 20, and the structure is therefore simpler than those of prior arts. According to this example, by using the connecting member 20 as a single part, the structure contributes to a reduction of manufacturing cost of the seat. Further, by using the plate-shaped connecting member 20, it is possible to reduce weight compared to a case where a rod-shaped head rest stay is used.

In this example, the flange parts 42*a*, 42*b*, 44, which form a part of the reinforcing part 40, are arranged across the bracket part 22 and the frame part 30. Therefore, it is possible to reinforce the border line JP between the bracket part 22 and the frame part 30 favorably. By providing the flange parts 42*a*, 42*b*, 44 in the outer end of the connecting member 20 on the outer circumference side, it is possible ensure more that the border line JP between the bracket part 22 and the frame part 30 is covered and thus reinforced favorably. Then, the ribs 50 are able to reinforce the first base point 35*a*, the second base point 35*b*, and the right bar part 32 between both base points 35*a*, 35*b* favorably. Further, the protruding portions 46*a*, 46*b* and so on, which form at least a part of the bracket part 22, are fixed to the fixing part 14 firmly in a state of being in surface contact with the fixing part 14 included in the panel member 6F. Therefore, the structure has excellent stability in attaching the head rests 8*a*, 8*b*.

Further, in this example, since the frame part 30 faces in an appropriate direction at each of the base points 35*a*, 35*b*, it is possible to arrange the pad part 8P of the head rest 8*a* so as to be able to receive and support an occupant's head favorably. Also, when the head rests 8*a*, 8*b* support the occupant's head, the occupant's head is arranged as if being fitted into the through-hole 38, and it is thus unlikely that hardness of the frame part 30 is felt directly. Then, the through-hole 38 and the ribs 50 on the left and right of the through-hole 38 enable the frame part to receive the occupant's head as if wrapping around it. Therefore, in this example, with a simpler structure, it is possible to fix the connecting members 20 provided in the head rests 8*a*, 8*b* to the corresponding seat backs 6*a*, 6*b*, respectively.

Here, the frame part may have various types of structures in addition to the foregoing structure. For example, with reference to FIG. 12, in a connecting member 20A according to a modification, a frame part 30 has a simple structure having a first base point 35*a* only, and the second base point in the example is omitted. In this modification, the frame part 30 having a simpler structure is directed towards a seating surface side of a seat at the first base point 35*a*. Therefore, it is possible to arrange the head rest so as to receive an occupant's head.

The vehicle seat according to the embodiment is not limited the one described above, and may have various other embodiments. In this embodiment, the structure of the connecting member 20 (shapes, dimensions, arrangement positions, the numbers of them to be arranged and so on) is explained as an example, but does not intend to limit the structure of the connecting member 20. For example, the frame part may be made of a plate-shaped or rod-shaped member, and may have various types of shapes such as a generally T shape and a generally H shape, in addition to an inverted U-shape in a front view. Also, the frame part may have three base points or more, or the base point may be omitted. The frame part may be directed in an appropriate direction by each of the base points, and the directions are not particularly limited as long as the support performance is not deteriorated to an extreme degree. For example, the frame part may be directed downward by the second base point. Also, the structure (shapes, dimensions, and so on) of the bracket part may also be changed as appropriate as long as the bracket part can be fixed to the fixing part of the seat back. Then, as a method of fixing the bracket part to the seat back, various methods may be exemplified such as welding, fastening, engaging, and adhering.

Further, in this embodiment, an example is explained where the connecting member 20 is provided with the through-hole 38, the reinforcing part 40 (42*a*, 42*b*, 44), and the ribs 50. For example, in the frame part, a single or plurality of through-holes having appropriate shapes and dimensions may be provided, or the through-holes may be omitted. Further, the reinforcing part may be provided at appropriate positions in the frame part and the bracket part, and the reinforcing part may be formed and divided between the frame part and the bracket part. The structure of the flange part may also be changed as appropriate, and, for example, the flange part may be formed in a rim of the through-hole that is an outer end of the frame part in the inner peripheral side. The rib may be formed at least one of the first base point and the second base point, and may be formed intermittently at appropriate positions in the frame part. Further, the reinforcing part and the ribs may project on the seating side of the seat and may project to the rear, which is opposite to the seating side. Then, the reinforcing part and the ribs may be formed by fixing separate members such as a flat plate piece and an angular material to a plate-shaped connecting member.

Also, in this embodiment, the structure (a shape, dimensions, and structural members and so on) of the vehicle seat 2 is described as an example, but does not intend to limit the structure of the vehicle seat. For example, a reinforcing portion, which is a linearly projecting portion, may be provided in a panel member in an appropriate direction, or the reinforcing portion may be omitted. Then, the fixing part may be provided at an appropriate position of the panel member. In this case, the fixing part may or may not include the reinforcing portion. Further, the seat back may have a frame having an arch shape to which the connecting member is fixed. In this case, it is possible to fix the bracket part of the connecting member to the frame part of the frame. Also, the structure of the embodiment is applicable to vehicle seats in general for vehicles, airplanes, trains and so on.

What is claimed is:

1. A vehicle seat comprising:
a seat cushion;
a seat back that is connected to a rear part of the seat cushion;
a head rest; and
a connecting member that is provided in the head rest,
wherein the head rest is arranged on top of the seat back in a standing state through the connecting member,
the connecting member has a frame part, which constitutes a frame of the head rest, and a bracket part, which is fixed to a side of the seat back, in an integrated manner, wherein the frame part and the bracket part are connected at a base point,
the frame part projects forward away from a seating side of the seat, on the seating side of the seat with respect to the bracket part, from the base point provided in a part of the frame part, and
a rib, which projects in a thickness direction of the frame part, is provided in the frame part, and the rib is arranged through the base point.

2. The vehicle seat according to claim 1, wherein the connecting member comprises a plate shape provided with a reinforcing part that is a depressing and projecting part of the connecting member in a thickness direction, and the reinforcing part is arranged across the bracket part and the frame part.

3. The vehicle seat according to claim 2, wherein a flange part is provided as at least a part of the reinforcing part, the flange part being an area where an edge of the connecting member is bent in the thickness direction.

4. The vehicle seat according to claim 3, wherein the flange part includes the edge of the connecting member on an outer circumference side.

5. The vehicle seat according to claim 1, wherein the frame part has a plate shape.

6. The vehicle seat according to claim 1, wherein
the frame part extends upwardly from another base point provided in a part of the frame part above the base point, and
the rib is arranged through the other base point.

7. The vehicle seat according to claim 6, wherein the rib is provided across the base point and the other base point.

8. The vehicle seat according to claim 1, wherein the frame part having a plate shape is provided with a through-hole that extends in a thickness direction of the frame part, and the through-hole is arranged in a center of the frame part in a seat width direction.

9. The vehicle seat according to claim 8, wherein the frame part is provided with a rib that is projected in the thickness direction of the frame part, and the rib has a shape projected towards a seating side of the seat and is provided on left and right sides of the through-hole in the seat width direction.

10. The vehicle seat according to claim 1, wherein
the seat back includes a plate-shaped panel member that constitutes a frame of the seat back, and a fixing part that is a part of the panel member and fixes the bracket part to the panel member, and
the bracket part is plate-shaped and is fixed to the fixing part in a state where the bracket part is arranged so as to face the fixing part, and at least a part of the bracket part is in surface contact with the fixing part.

* * * * *